United States Patent Office
2,901,472
Patented Aug. 25, 1959

2,901,472
METHOD OF CONVERTING DIFFICULTLY SOLUBLE ORGANIC COMPOUNDS TO READILY SOLUBLE COMPLEX COMPOUNDS, AND SAID COMPLEX COMPOUNDS

Martin Ruben, Milan, Italy

No Drawing. Application April 21, 1955
Serial No. 503,007

Claims priority, application Italy April 24, 1954

10 Claims. (Cl. 260—96.5)

The invention relates to readily soluble adducts of difficultly soluble organic compounds, and to a method of preparing such adducts.

The good properties of organic compounds can frequently not be used to full advantage because of their low solubility in water. This is particularly true for therapeutically efficient compounds, where the low solubility for instance may not allow to prepare aqueous solutions of the desired concentration for injections. Examples of such difficultly soluble compounds are aminopyrine (4-dimethylamino-1,5-dimethyl-2-phenyl-3-pyrazolone), caffeine, quinine salts, e.g. the hydrochloride, barbituric acid derivatives, and the like.

Several methods have been proposed to render difficultly soluble organic compounds better soluble in water. For instance, it is known that concentrated aqueous urethan solutions increase the water solubility of such compounds to a certain extent. However, unless the thus obtained solutions are already very diluted, the dissolved compound re-precipitates on further dilution with water. It is, for instance, not possible to prepare in this way urethan solutions containing more than 3 percent of diethyl barbituric acid.

For the same reasons, it was not possible to obtain stable solutions of aminopyrine by means of methyl or other alkyl derivatives of urea.

It is a principal object of the invention to provide difficultly soluble organic therapeutically useful compounds, of the type represented by aminopyrine, quinine salts, caffeine, and the like, in a solid readily water soluble form.

It is another object of the invention to provide a method for converting aminopyrine, caffeine, quinine salts, and similar difficultly soluble pyrazolone derivatives and alkaloids into solid, readily water soluble compounds.

Other objects and advantages will become apparent from a consideration of the specification and claims.

I have found that under certain conditions carbamic acid esters or mixtures of such esters and alkyl derivatives of urea may form with aminopyrine solid water soluble compounds. This discovery was all the more surprising as it was known that a particular property of solid urethans is that they do not form solid mixtures when added to certain solid other organic compounds. For instance, it has been impossible to mix powdered urethan and aminopyrine to stable mixtures because such a mixture liquefies and produces a syrupy liquid, which is unsuitable for pharmaceutical purposes because it cannot be converted to tablets or dragées.

The novel solid compounds of aminopyrine with carbamic acid esters or mixtures of such esters and alkyl derivatives of urea are so-called inclusion or occlusion compounds, which have very interesting physical properties. They are stable crystalline substances, which contain the carbamic acid ester and the aminopyrine in a ratio of about 2:1 and have excellent solubility properties; they readily allow the preparation of aqueous solutions which contain the aminopyrine in high concentrations not obtainable heretofore. In such solutions of the inclusion compounds, the aminopyrine has a toxicity which is only a third of that in pure solutions, but it has at the same time a 30% stronger antipyretic effect than in pure solutions of the same concentration.

The preparation of the inclusion compounds may be carried out in various ways. According to one embodiment of the invention, urethan or a mixture of urethan and alkyl derivatives of urea is first converted to a melt and then aminopyrine is incorporated in said melt. On cooling, the syrupy melt solidifies and forms pulverizable crystals.

The solidified melt is extremely hard and rather difficult to grind because the heat developed during the grinding process has to be carried off to avoid that the product becomes pasty. For this reason, it is frequently preferable to dissolve the product in water or in another suitable solvent and to spray dry the solution.

Instead of preparing first the melt and then dissolving the same, it is also possible to start with concentrated solutions of the components of the inclusion compound, mix said solutions, remove the major part of the water, preferably under reduced pressure, and then spray drying the combined solutions at a temperature where the inclusion compound is formed. It is of course also possible to heat the combined solutions before the water is removed and then subject the concentrate to spray drying at said elevated temperature.

Suitable urethans are methyl and ethyl urethan; but other carbamic acid esters, such as trichloroethyl urethan and the like, may also be used. Up to 30 percent by weight of the urethan, for instance 5 to 30 percent, may be replaced by alkyl derivatives of urea, such as monomethyl urea, sym. dimethyl urea, and others.

Though I have described the invention with special reference to aminopyrine, it is to be understood that in the same way water soluble inclusion compounds of carbamic acid esters, or mixtures of such ester and alkyl derivatives of urea with other difficultly soluble compounds of similar composition, i.e. of heterocyclic compounds containing in the ring structure nitrogen, and carbon bound to oxygen, may be obtained; further examples of such compounds are, for instance caffeine and quinine hydrochloride. The temperature at which the inclusion compound of these components is formed, is, as a rule, about 60–70° C. and readily ascertained, and during the preparation, be it by a fusion process or by spraying concentrated solutions, the mixture must be heated to said temperature.

The formation of the water soluble inclusion compounds is not limited to compounds with only one of the difficultly soluble components; in the same way as described for the two component system, three component complexes, for instance urethan-aminopyrine-caffeine complexes, are obtained, in which form the normally difficultly soluble components aminopyrine and caffeine have a greatly increased solubility in water.

The following examples of some embodiments of my invention are intended to be illustrative only and not to limit its scope, which is defined by the appended claims.

Parts are given by weight, unless specified otherwise.

*Example 1*

2 moles of dry ethyl urethan are heated on a water bath at about 50° C. until a clear melt is obtained, and then 1 mole of powdered aminopyrine is added to the melt. A syrupy liquid is formed, which on further heating to about 65° C. becomes clear. On cooling to room temperature or below, the melt solidifies to a crystalline mass.

The end product is stable, non hygroscopic and has a melting point of 53° C. While aminopyrine has a solubility of only 1 part in 18 parts of water, the inclusion compound has a solubility of 1 g. in 1.5 cc. of water at 20° C. and of 1 g. in 1 cc. of water at 55° C.

Similar results are obtained when 5 to 30 percent of the urethan are replaced by a methyl urea.

Instead of preparing the inclusion compound from the dry substances by fusion and heating to the complex formation temperature of 65° C., the concentrated combined solutions of the compounds may be heated under reduced pressure to remove the water, and then dry sprayed at a temperature of 65 to 70° C.; of course, the solutions may also be heated to said temperature separately, and then be combined at said temperature for spraying. As set forth hereinabove, the spray drying of the solutions has the advantage of obtaining the very hard inclusion compound directly in the form of a fine powder.

*Example 2*

In the manner described in Example 1, a melt of 178 parts of methyl urethan is prepared, and 40 parts of caffeine and 230 parts of aminopyrine are introduced into the melt at a temperature of about 65 to 70° C. The caffeine and aminopyrine may be incorporated in the melt together, or consecutively, whereby I found it expedient to bring into the melt first the caffeine to obtain the urethan caffeine compound and to introduce then into said molten compound the aminopyrine. In this way, the reaction is readily completed, whereas it takes more time when the caffeine is introduced into the urethan-aminopyrine complex.

The obtained methyl urethan-aminopyrine-caffeine inclusion compound has a melting point of 60° C. and a solubility of 1 part in 1.5 parts of water.

A particular advantage of the aminopyrine inclusion compounds is their solubility in oils and fats, which makes it possible, for instance, to incorporate such compounds directly in suppositories.

*Example 3*

A melt of 37 parts of methyl urethan and 3 parts of ethyl urea (or N,N'-dimethyl urea) is prepared and 60 parts of quinine hydrochloride are incorporated in the melt, which is heated at about 60 to 70° C. until the quinine salt is completely dissolved.

The obtained small crystals have a melting point of 45° C. and 1 g. thereof is dissolved in 2 g. of warm water of about 35–40° C.

*Example 4*

In the manner described in Example 1, a melt of 49 parts of ethyl urethan and 3 parts of N,N'-dimethyl urea is prepared, and 10 parts of caffeine and 38 parts of aminopyrine are introduced into the melt at a temperature of about 60 to 70° C. The caffeine and aminopyrine may be incorporated in the melt together or consecutively as described in Example 2. The obtained ethyl urethan-N,N'-dimethyl urea-caffeine-aminopyrine inclusion compound has a melting point of 55–56° C. and a solubility of 1 part in 2 parts of water of about 35–40° C.

The physical properties of the obtained inclusion compounds are, within the recited range, substantially independent of the proportion of alkyl urea contained in the urethan; the melting points and solubilities given in the examples are those of the inclusion compounds prepared with methyl or/and ethyl-urethan alone as well as with mixtures in which up to 30 percent of the urethan are replaced by alkyl urea.

What I claim is:

1. A method of converting difficulty soluble organic heterocyclic compounds selected from the group consisting of aminopyrine, caffeine, and salts of quinine, to crystallizable readily soluble stable inclusion compounds, said method comprising heating said heterocyclic compound under substantially anhydrous conditions with at least the stoichiometric amount of a member of the group consisting of methyl urethan, ethyl urethan, and mixtures of at least one of said urethans with not more than 30 percent, calculated on the weight of said urethan, of an alkyl derivative of urea, above the melting point of said urethan, and cooling, thereby forming a crystalline stable water-soluble inclusion compound of said reactants.

2. A method of converting difficultly soluble organic heterocyclic compounds selected from the group consisting of aminopyrine, caffeine, and salts of quinine, to crystallizable readily soluble stable inclusion compounds, said method comprising melting a member of the group consisting of methyl urethan, ethyl urethan, and mixtures of at least one of said urethans with not more than 30 percent, calculated on the weight of said urethan, of an alkyl derivative of urea, introducing said heterocyclic compound in an amount not exceeding the stoichiometric amount into said melt, heating the melt to about 60° to 70° C., and solidifying the melt by cooling, thereby forming a crystalline stable water-soluble inclusion compound of said reactants.

3. The method of claim 2, wherein the solidified melt is dissolved and spray dried so as to obtain the inclusion compound in powdery form.

4. The method of claim 2, wherein the molar ratio of said heterocyclic compounds to said complex forming compounds is adjusted to about 1:2.

5. A stable aminopyrine-urethan inclusion compound containing aminopyrine and ethyl urethan in a molar ratio of about 1:2 and having a melting point of 53° C. and a solubility of about 1 g. in 1.5 cc. water of 20° C.

6. A stable aminopyrine-caffeine-urethan inclusion compound containing aminopyrine-caffeine and ethyl urethan in a molar ratio of about 1:2 and having a melting point of 60° C. and a solubility of 1 g. in 1.5 cc. water of 20° C.

7. A water soluble stable quinine hydrochloride-urethan inclusion compound containing quinine hydrochloride and ethyl urethan in a molar ratio of about 1:2 and having a melting point of about 45° C.

8. A water soluble quinine hydrochloride-urethan-alkyl urea inclusion compound consisting of about 60 parts by weight of quinine hydrochloride, about 37 parts by weight of ethyl urethan and about 3 parts by weight of alkyl urea, and having a melting point of 45° C.

9. A stable aminopyrine containing inclusion compound consisting of 1 mole of aminopyrine and about 2 moles of a mixture of ethyl urethan with about 5 to 30 percent by weight, calculated on said ethyl urethan, of an alkyl derivative of urea, said compound having at 20° C. a solubility of about 1 g. in 1.5 cc. of water.

10. The inclusion compound as defined in claim 9 wherein said alkyl derivative of urea is $N,N^1$-dimethyl-urea.

References Cited in the file of this patent

UNITED STATES PATENTS

| | | |
|---|---|---|
| 1,773,837 | Wolffenstein | Aug. 26, 1930 |
| 2,046,116 | Greenbaum | June 30, 1936 |
| 2,295,606 | Riethof | Sept. 15, 1942 |
| 2,539,483 | Ruskin | Jan. 30, 1951 |
| 2,566,292 | Reese | Aug. 28, 1951 |
| 2,613,204 | Fetterly | Oct. 7, 1952 |
| 2,731,382 | Basso et al. | Jan. 17, 1956 |
| 2,731,383 | O'Neill et al. | Jan. 17, 1956 |
| 2,731,384 | O'Neill et al. | Jan. 17, 1956 |
| 2,731,385 | O'Neill et al. | Jan. 17, 1956 |

OTHER REFERENCES

U.S. Dispensatory, Osol-Farrar, 24th ed. (1947), p. 969.

U.S. Dispensatory, Osol-Farrar, 24th ed., pp. 1259 and 1260.